April 4, 1944.  F. T. SMITH  2,345,952

BEARING CONSTRUCTION

Filed Dec. 16, 1942

Inventor
Floyd T. Smith

Witness:
Godfrey Pecina

By John F. Heine
Attorney

Patented Apr. 4, 1944

2,345,952

UNITED STATES PATENT OFFICE 2,345,952

BEARING CONSTRUCTION

Floyd T. Smith, White Plains, N. Y., assignor to The Singer Manufacturing Company, Elizabeth, N. J., a corporation of New Jersey Application December 16, 1942, Serial No. 469,154

6 Claims. (Cl. 308—189)

This invention relates to bearing constructions and more particularly to bearings for use on small dynamo electric devices especially adapted for service on aircraft.

Due to the extreme temperatures encountered by many aircraft which today ascend to high altitudes, it becomes necessary, particularly in the case of the delicate instruments associated with such aircraft, to employ some form of temperature compensation. This need for compensation is augmented by the joint use of materials having different coefficients of thermal expansion such, for example, as aluminum housings for light weight combined with steel shafts for wear.

More particularly, it has been found that the anti-friction bearings employed on a small aircraft motor, while satisfactory at ordinary temperatures, tighten up and bind at the low temperatures commonly encountered and so load the motor that either its speed drops off to some useless low value or it stops altogether.

This behavior is caused by two factors, viz., (1) the differential expansion and contraction between the steel shaft and the aluminum housing and (2) the inability of present bearing constructions to properly take up this expansion and contraction throughout the extreme temperature ranges now experienced.

This difficulty is especially serious in connection with small electric motors designed for aircraft service in which light alloys and high speeds are generally combined to make a light weight motor. Such a motor is unfortunately more susceptible to rapid heating and cooling with it associated expansion and contraction than would be the case for a heavier motor.

Ordinarily the differential thermal expansion and contraction has been taken up heretofore by the well-known expedient of providing a steel ball bearing the outer race-ring of which is free to move axially within and relative to an aluminum supporting hub and of preferably preloading said bearing with a resilient axial spring thrust to take up any end-play. While this arrangement appears to be satisfactory for ordinary temperature changes, it has been found that, what was at sea level a push or finger fit between the bearing and the hub becomes at the low temperatures of the substratosphere, a tight shrink fit due to the greater radial contraction of the aluminum hub relative to the steel outer bearing race-ring. This tightness of fit prevents the bearing from yielding axially so as to properly take up the unequal expansion between housing and shaft. As a result, the bearing balls are cramped between the race rings under a heavy thrust load causing the bearing to "freeze" and tighten up.

It is, therefore, an object of this invention to provide a ball bearing construction which shall maintain its anti-friction properties over a sufficiently wide temperature range.

According to my invention, I propose to keep substantially the present standard construction for the rotor shaft and the bearings therefor, but to provide a new and useful hub construction for receiving said bearings which prevents binding between the bearing race-ring and hub over a sufficiently wide temperature range.

My invention is not limited to dynamo electric machines but obviously extends to applications involving rotatable elements and their associated bearings wherein difficulty from wide variations in temperature may be expected.

Referring to the drawing showing the preferred form of my invention—

Figure 1:
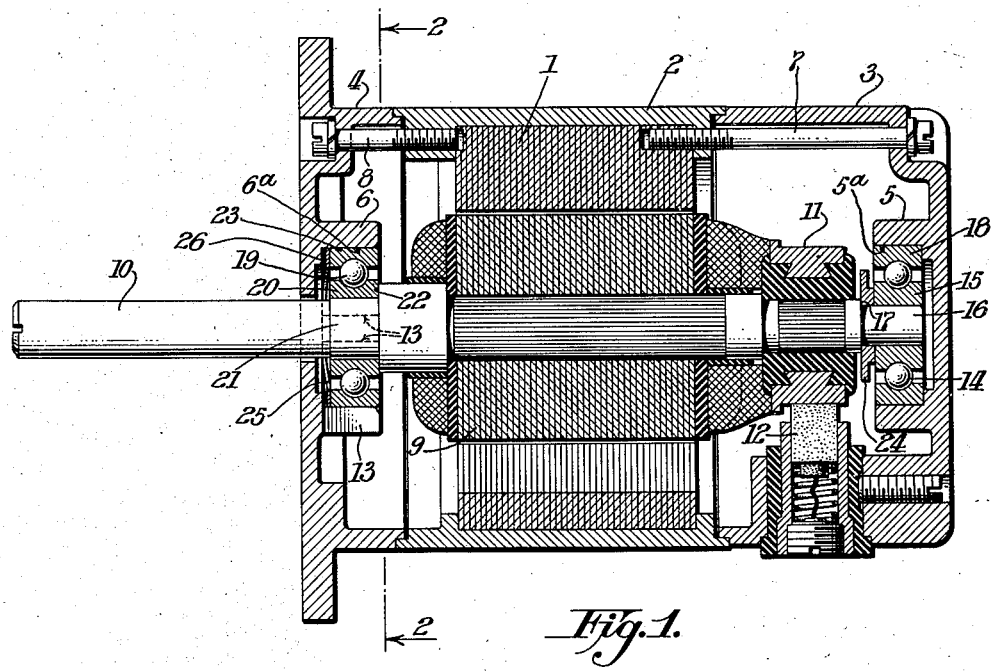
Fig. 1 is a longitudinal sectional view taken through a dynamo electric machine illustrating my invention.
Figure 2:
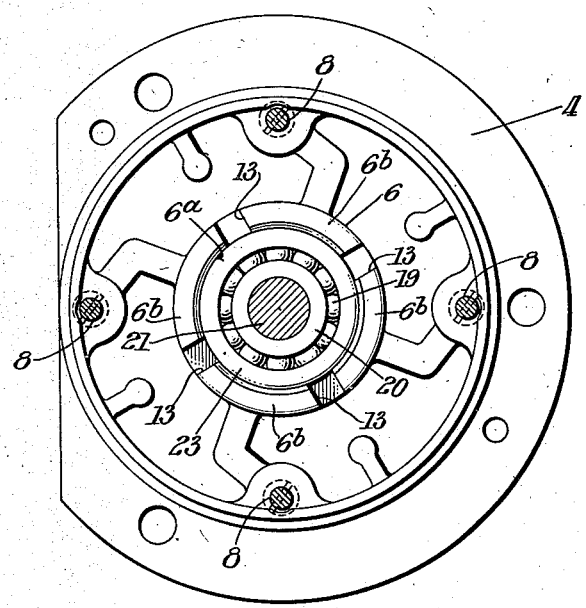
Fig. 2 is a transverse sectional view, partly in elevation, taken substantially on line 2—2 of Fig. 1.

The motor employed to illustrate the invention is a commutator type motor adapted for use in aircraft for driving instruments associated therewith and comprises a wound magnetizable stator core 1 held within an aluminum frame 2. Die-cast aluminum end bonnets 3 and 4 are formed with bearing supporting hubs 5 and 6, respectively, and are secured to said frame 2 by means of respective tap bolts 7 and 8 threaded into said frame. A wound magnetizable rotor core 9 is carried by a steel shaft 10 and is free to rotate within the stator core 1. A commutator 11 and brushes 12 (only one shown), provide means for introducing current into the rotor in a manner well known to those skilled in the art.

The hub 5 is formed preferably with a closed annular edge portion while the hub 6 is formed with a similar edge portion except that it is provided with peripherally spaced slots 13 which penetrate the full depth of the hub to destroy the peripheral continuity thereof. The hubs 5 and 6 contain respective bearing-receiving bores 5$^a$ and 6$^a$.

A ball bearing 14, preferably having a loose race and ball fit has its inner race-ring 15 pressed lightly onto a reduced portion 16 of shaft 10 and is positioned axially against an oil-shield disc 24 which bears against a shoulder portion 17.

The outer race-ring 18 of bearing 14 is secured within the bore 5ª of the hub 5 by means of a light press fit therewith. Similarly, adjacent the opposite end of shaft 10 is a ball bearing 19, preferably having a loose race and ball fit and having inner race-ring 20 pressed lightly onto reduced portion 21 of said shaft and positioned axially against a shoulder portion 22 of said shaft. The outer race-ring 23 of bearing 19 is carried within the bore 6ª of the slotted hub 6 by a finger fit therewith to allow said bearing to find its own axial position within said bore and to prevent the accumulation of detrimentally large thrust loads due to relative expansion or contraction of the parts. The depth of the bore 6ª may be made sufficiently greater than the axial length of the bearing to accommodate the expected axial travel of the outer race-ring 23 relative to the hub 6. Further, the bottom of the bore 6ª is preferably formed with a shoulder portion 26 which serves as a stop to limit the travel of said outer race-ring.

The ball bearings 14 and 19 are standard commercially available bearings and are preferably of the loose race and ball fit type well known to the art and which permits some slight relative axial and radial motion of the outer and inner raceways.

It will be noted that the housing, comprising the stator frame 2 and the end bonnets 3 and 4, is formed of aluminum to save weight, while the shaft 10 and bearings 14 and 19 are made of steel to provide good wearing qualities. Since the coefficient of expansion for aluminum is about double that for steel, the housing will expand or contract axially more than the shaft with the bearings secured thereto for the same temperature range. This unequal expansion is taken up by purposely maintaining a push or finger fit between the outer race-ring 23 and the bore 6ª of the hub 6 so that said race-ring may move axially in the manner of a piston, when so urged. In effect, the hub 6 provides a series of cantilever elements 6ᵇ projecting from the aluminum end bonnet 4 to form a resilient socket embracing the steel outer race-ring 23. Preferably a spring washer 25 is disposed between the outer race-ring 23 and the stop shoulder 26 to preload the bearing axially in accordance with well-established practice for taking up end play.

It will be understood that, without the slots 13, the arrangement is unfortunately ideal for shrinking the aluminum hub onto the outer steel race-ring due to the greater contraction of aluminum as the temperature is lowered. However, since this is undesirable in interfering with the free axial movement of the bearing 19 relative to the hub 6 as pointed out hereinbefore, the hub is slotted, according to the invention, to its full depth so that it cannot support sufficient circumferential tension to grip the bearing with a tight shrink fit. Further the portions 6ᵇ of the hub between the slots serve as cantilever fingers which yield radially and provide a composite resilient receiving socket for the bearing to aid in maintaining a push fit between hub and bearing over a sufficiently large change in temperature.

Although four slots 13 are shown in the hub 6, it is obviously within the scope of the invention to employ as many slots as are necessary to maintain the desired fit, depending on the hub dimensions.

In those cases where it is not essential or desirable that the end-play be taken up, the washer 25 may be entirely dispensed with, or an ordinary shim may be substituted for the spring washer and its thickness so chosen as to obtain the predetermined amount of end-play. This is clearly within the scope of the present invention.

It will be perceived from the above description that I have provided a simple, novel and useful bearing construction for rotatable shafts, which construction assists in maintaining the initial anti-frictional qualities over a wide temperature range.

As used herein, the term "normal temperatures" is intended to mean such temperatures as are commonly encountered at sea level, as, for example, from 0 to 110 degrees Fahrenheit, while the term "relatively low temperatures" is intended to include temperatures such as are encountered in the substratosphere, for example, as low as minus 50 degrees Fahrenheit.

To those skilled in the art, it will be obvious that the invention may, without departure from its essential attributes, be embodied in various specific forms other than that shown and described, which latter is to be considered in all respects as illustrative of the invention and not restrictive.

Having thus set forth the nature of the invention, what I claim herein is:

1. The combination with a rotatable shaft, and a bearing housing therefor having different coefficients of thermal expansion, of a hub formed on said housing and having a peripheral edge portion interrupted at intervals around said edge portion by means of slots longitudinally disposed therein, a bearing having an outer race-ring push-fitted within said hub, and an inner race-ring secured to said shaft.

2. In combination, a rotatable shaft, a bearing support therefor, a hub formed on said support and having a peripheral edge portion interrupted at spaced intervals around said edge portion by means of axial slots formed therein, a bearing-receiving bore formed in said slotted hub and having a stop shoulder therewithin, a bearing having an outer race-ring slidably seated in said bore and push-fitted within said hub, a spring washer disposed axially between said outer race-ring and said stop shoulder, said bearing having an inner race-ring carried by said shaft.

3. A bearing construction comprising a supporting member, a cup-like hub formed integral with said supporting member and projecting from one side thereof, said hub having a plurality of slots therein dividing said hub into a plurality of sectors, and an anti-friction bearing having an outer race-ring push-fitted within said hub.

4. A bearing construction adapted to function uniformly over a wide temperature range, comprising a supporting member made of relatively lightweight metal having a relatively high coefficient of thermal expansion, a cup-like hub formed integral with said supporting member and projecting therefrom, said hub having a plurality of slots formed therein and breaking the peripheral continuity thereof, and an anti-friction bearing including an outer race-ring, of metal having a relatively low coefficient of thermal expansion, having a push-fit within said hub under normal temperatures, said slots rendering said hub sufficiently yielding to prevent said hub from contracting sufficiently to destroy said push-fit under relatively low temperatures.

5. A dynamo electric machine comprising a frame, a pair of end bonnets secured thereto, each of said end bonnets having formed integrally therewith a cup-like bearing-supporting hub projecting from one side thereof, one of said hubs having therein a plurality of slots dividing the hub into a plurality of sectors, an anti-friction bearing having an outer race-ring having a push fit within said sectors under normal temperatures, said race-ring having a lower coefficient of thermal expansion than said end bonnets, said slots rendering said hub sufficiently yielding to prevent said sectors from binding on said race-ring sufficiently to prevent axial shifting of said race-ring in said sectors under relatively low temperatures.

6. A dynamo electric machine comprising a frame, a pair of end bonnets secured thereto, each of said end bonnets being made of metal having a relatively high coefficient of thermal expansion and having formed integrally therewith a cup-like bearing-supporting hub projecting from one side thereof, an anti-friction bearing having an outer race-ring fitted within each of said hubs and an inner race-ring rotatably journaled in the outer race-ring, a shaft fitted within said inner race-rings, said shaft and bearings being made of metal having a relatively low coefficient of thermal expansion, one of said bearing hubs having therein a plurality of slots dividing the hub into a plurality of substantially rigid sectors within which the associated outer race-ring is held by a push fit under normal temperatures, said sectors being sufficiently yielding to preclude gripping of the inserted race-ring with sufficient contractive force to alter said push-fit when said parts are subjected to relatively low temperatures.

FLOYD T. SMITH.